UNITED STATES PATENT OFFICE.

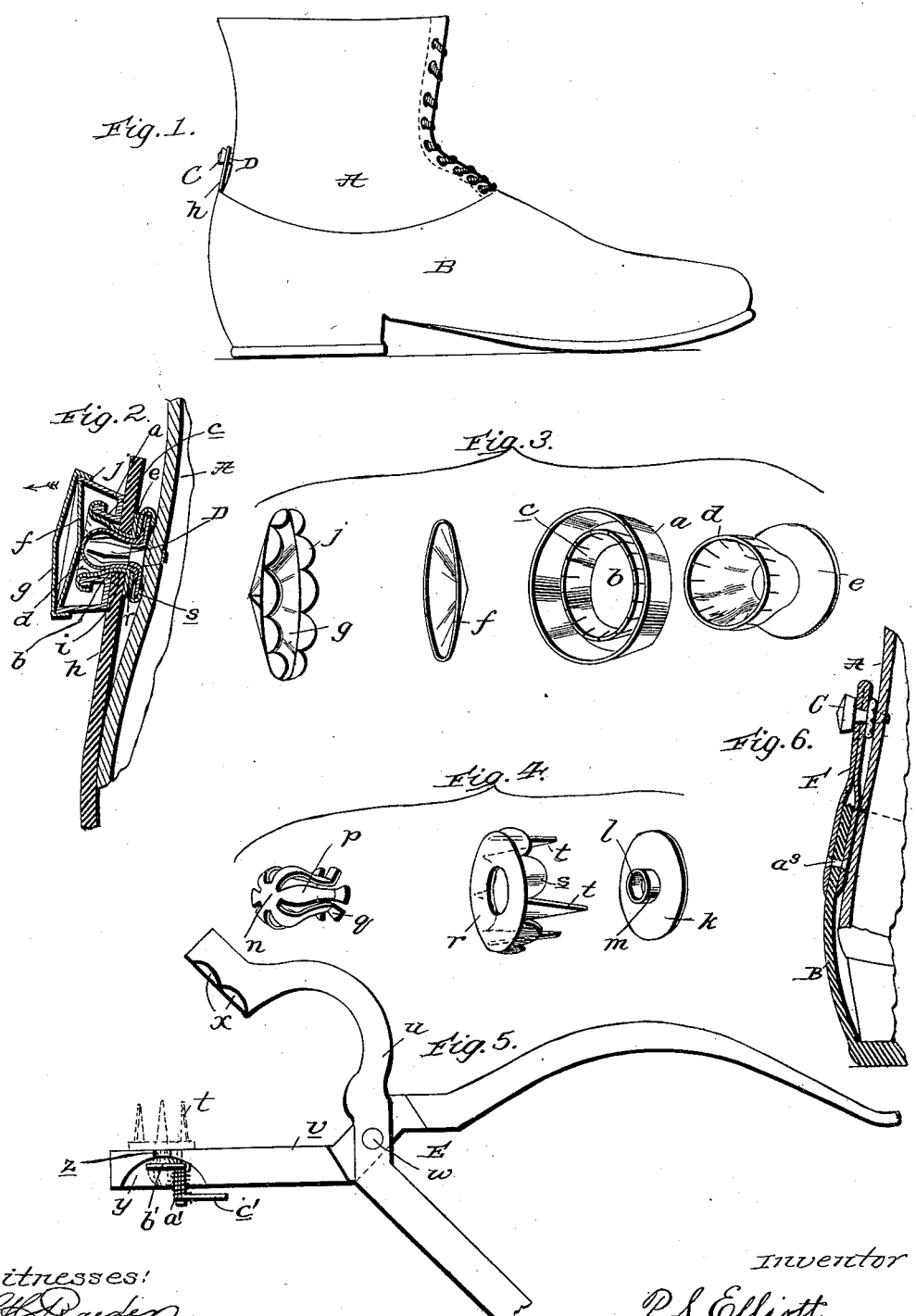

PHILIP S. ELLIOTT, OF LAWRENCE, KANSAS.

FASTENER.

SPECIFICATION forming part of Letters Patent No. 635,758, dated October 31, 1899.

Application filed January 10, 1899. Serial No. 701,760. (No model.)

*To all whom it may concern:*

Be it known that I, PHILIP S. ELLIOTT, a citizen of the United States, residing at Lawrence, in the county of Douglas and State of Kansas, have invented a new and useful Improvement in Fasteners, of which the following is a specification.

My invention relates to fasteners; and it consists in the peculiar and advantageous construction hereinafter described, and particularly pointed out in the claims appended.

In the annexed drawings, Figure 1 is a side elevation of a shoe and an overshoe equipped with my improvements, the latter being shown as connected to the former. Fig. 2 is an enlarged vertical section illustrating the stud and socket members of my fastener in engagement. Fig. 3 comprises separated perspective views of the parts of which the socket member is composed. Fig. 4 comprises separated perspective views of the parts of which the stud member is composed. Fig. 5 is a broken side elevation of an implement which I prefer to employ in fastening the stud member to a shoe. Fig. 6 is a detail section of a modification.

In the said drawings similar letters designate corresponding parts in all of the several views, referring to which—

A is a shoe, B an overshoe or rubber, and C the socket member of my fastener. This member C is preferably formed of light slightly-resilient sheet metal and preferably comprises a cup-shaped body $a$, having a central aperture $b$ and a slightly-flared and slitted flange $c$, surrounding the same, an inwardly-flaring fastening-socket $d$, which has its inner end slitted and is provided at its outer end with a flange $e$, a concavo-convex strengthening-disk $f$, and a strengthening cap or cover $g$. Said member C is designed to be connected to the upper rear portion of the overshoe or to an extension $h$ thereof at the time of manufacturing it. In applying it the overshoe is punctured at $i$, (see Fig. 2,) and the socket $d$ is passed through the aperture from the inside of the overshoe outwardly and into the flanged aperture $b$ of the body $a$, which is disposed at the outside of the overshoe. With this done the slitted end of the socket $d$ and the slitted portion of the flange $c$ are bent over, as shown in Fig. 2, and in consequence the socket $d$ and body $a$ are securely connected together and fixed in position on the overshoe. The disk $f$, which has for its purpose to lend rigidity and strength to the body $a$, is now placed in position, as shown in Fig. 2, after which the strengthening cap or cover $g$ is placed in position and secured to the body $a$ by bending its ears $j$ against the side wall of the body.

D is the stud member, which is also preferably formed of light slightly-resilient sheet metal and is designed to be placed on the market, together with the overshoe equipped with member C. Said member D is designed to be attached to the shoe of the purchaser of the overshoe. It preferably comprises a base $k$, having a central aperture $l$ and a collar $m$ surrounding the same, a bulb-like protuberance $n$, which is formed by slitting a single disk of material and properly shaping the same to form spring-arms $p$ and flanges $q$ at the terminals thereof, and an apertured retaining-plate $r$, which has ears $s$ and fastening-prongs $t$, as shown. In assembling these parts to form the stud member D the protuberance $n$ is passed through the aperture of the plate $r$ and its arms $p$ are grouped around the collar-flange $m$ of the base $k$, with the angular branches of said arms interposed between the said base $k$ of the plate $r$. With this done the ears $s$ of plate $r$ are bent over upon the plate $k$, when the parts are securely connected together. The arms $p$ of the protuberance $n$ are preferably of the shape shown—that is to say, widest at the largest part of the protuberance and diminishing slightly toward each end, so as to add to the strength of the spring thereof.

To secure the member D to the back of a shoe, the fastening-prongs $t$ of plate $r$ are passed through the shoe-upper from the outside and are bent against the inside of the shoe-upper after the manner shown in Fig. 2. In order that the member D may thus be quickly and easily connected to the shoe, I have devised the implement E. (Shown in Fig. 5.) This implement comprises two members $u\ v$, connected at $w$ in a hinged manner. The member $u$ is provided in its inner face with the concavities $x$, which extend to one of its edges, as shown, and the member $v$ is provided in its outer face with a concavity $y$, which extends to one of its side edges, and is connected by a transversely-disposed slot $z$ with its other or inner face. Said member $v$ is also provided with a spring-pressed catch $a'$, which has the protuberance-engaging portion $b'$ and a finger-piece $c'$.

In using the implement E the stud member D is placed and secured in the member $v$, as shown by dotted lines in Fig. 5, and after the back portion of the shoe-upper is folded or rolled down one or more times the implement is applied to the shoe-upper with the member $u$ at the inside and the member $v$ at the outside thereof, and the members $u$ $v$ are pressed together, with the result that the fastening-prongs $t$ will be quickly driven through the upper and clenched against the inside of the same. The member $u$ is curved, as shown, to receive the folded portion of the shoe-upper.

In lieu of connecting the fastener member C directly to an overshoe or extension thereof it may be connected to a strip F of rubber or leather folded upon itself. The fastener member may be connected to the folded strap in the same way that it is connected to the overshoe, and the ends of the strap may be disposed at either side of the back of an overshoe and riveted or otherwise connected thereto, as shown in Fig. 6. From this it follows that the strap F, bearing the socket member C, may be sold together with the stud member D, and when an overshoe is sold the strap F may be readily connected thereto and the stud member D may be secured to the shoe of the purchaser.

In using my improvements when an overshoe is placed on a shoe it may be quickly and easily secured thereto by simply pressing the socket member against the protuberance $n$ of the stud member, when said protuberance will spring into the socket $d$ of the socket member and remain therein secure against casual disengagement. When, however, it is desired to remove the overshoe from the shoe, the same may be quickly and easily accomplished by pressing the overshoe in the direction indicated by arrow in Fig. 2.

While I have shown and described my improved fastener members as applied to a shoe and overshoe, I do not desire to be understood as confining myself to such application of the fastener members, as they may be employed on any two devices that it is desired to connect or to two parts of a single device.

Having thus described my invention, what I claim is—

1. A stud member of a fastener comprising a base-plate having a circular, central projection, a plate $r$ arranged at the side of the base-plate and having a central aperture receiving the projection of the base-plate, and ears bent over the edge of said base-plate, and also having lateral fastening-prongs, and the bulblike protuberance extending through the aperture of plate $r$ and having arms grouped about the central projection of the base-plate and terminating in flanges interposed between the plate $r$ and the base-plate, substantially as specified.

2. A socket member of a fastener comprising a cup-shaped body having a central aperture and a slitted flange surrounding the same, the fastening-socket arranged in the aperture of the body having at one end a base-flange and having its other end slitted and bent over the slitted flange of the body, the strengthening-disk arranged within the outer side wall of the body, and the strengthening-cap having ears bent against the side wall of the body, substantially as specified.

3. In a fastener, a socket member comprising the cup-shaped body having the central aperture and the slitted flange surrounding the same, the fastening-socket arranged in the aperture of the body having at one end a base-flange and having its other end slitted and bent over the slitted flange of the body, the strengthening-disk arranged within the outer side wall of the body, and the strengthening-cap having ears bent against the side wall of the body; in combination with a stud member adapted to be received and held in the socket of the socket member, substantially as specified.

In testimony whereof I have hereunto set my hand in presence of two subscribing witnesses.

PHILIP S. ELLIOTT.

Witnesses:
WILLIAMS P. RANDALL,
A. M. RENICK.